US012590573B2

(12) United States Patent
    Easton

(10) Patent No.: US 12,590,573 B2
(45) Date of Patent: Mar. 31, 2026

(54) METHOD OF GENERATING DRIVE SIGNALS FOR DRIVING AN SMA APPARATUS

(71) Applicant: CAMBRIDGE MECHATRONICS LIMITED, Cambridge (GB)

(72) Inventor: Mark Easton, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 301 days.

(21) Appl. No.: 18/567,681

(22) PCT Filed: Jun. 6, 2022

(86) PCT No.: PCT/GB2022/051416
    § 371 (c)(1),
    (2) Date: Dec. 6, 2023

(87) PCT Pub. No.: WO2022/258952
    PCT Pub. Date: Dec. 15, 2022

(65) Prior Publication Data
    US 2024/0271605 A1      Aug. 15, 2024

(30) Foreign Application Priority Data
    Jun. 7, 2021    (GB) ..................................... 2108092

(51) Int. Cl.
    *F03G 7/06*        (2006.01)
    *G02B 27/64*        (2006.01)
    (Continued)
(52) U.S. Cl.
    CPC ....... *F03G 7/06143* (2021.08); *G02B 27/646* (2013.01); *G03B 5/00* (2013.01);
    (Continued)

(58) Field of Classification Search
    CPC . F03G 7/06143; G02B 27/646; G02B 13/009; G02B 7/09; G03B 5/00;
    (Continued)

(56) References Cited

U.S. PATENT DOCUMENTS

2015/0260169 A1*  9/2015  Easton .................. F03G 7/0665
                                                        60/527
2021/0402902 A1*  12/2021  Dörfler ................. F16K 31/002

FOREIGN PATENT DOCUMENTS

GB          2558748  A      7/2018
GB          2601833  A      6/2022
                (Continued)

OTHER PUBLICATIONS

GB Search and Examination Report of GB Application No. 2108092.4 dated Jul. 12, 2022.
                (Continued)

*Primary Examiner* — Mariam Qureshi
(74) *Attorney, Agent, or Firm* — Van Hoven PC; Stefan D. Osterbur; Joshua Van Hoven

(57)          ABSTRACT

A method of generating drive signals for driving an SMA apparatus, wherein the SMA apparatus comprises two SMA actuator assemblies each comprising a respective set of one or more SMA wires, the method comprising the steps of: outputting drive signals for applying to the SMA wires of the sets of SMA wires so as to independently drive the SMA actuator assemblies; and outputting a measurement pulse for measuring an electrical characteristic of an SMA wire, and suppressing or delaying the drive signals for applying to both sets of SMA wires for the duration of the measurement pulse, such that the measurement pulse is applied in the absence of any drive signal.

20 Claims, 3 Drawing Sheets

(51) Int. Cl.
 G03B 5/00 (2021.01)
 G03B 13/36 (2021.01)

(52) U.S. Cl.
 CPC ...... *G03B 13/36* (2013.01); *G03B 2205/0007*
   (2013.01); *G03B 2205/0046* (2013.01); *G03B 2205/0076* (2013.01)

(58) Field of Classification Search
 CPC ............ G03B 13/36; G03B 2205/0007; G03B 2205/0046; G03B 2205/0076; G03B 3/10; G03B 5/06; G03B 30/00; H04N 23/687
 See application file for complete search history.

(56) References Cited

FOREIGN PATENT DOCUMENTS

| | | | |
|---|---|---|---|
| JP | 2019113578 | A | 7/2019 |
| WO | 2018029458 | A1 | 2/2018 |
| WO | 2020115260 | A1 | 6/2020 |
| WO | 2020152481 | A1 | 7/2020 |
| WO | 2020228392 | A1 | 11/2020 |

OTHER PUBLICATIONS

International Search Report and Written Opinion of PCT/GB2022/051416 dated Oct. 14, 2022.

* cited by examiner

METHOD OF GENERATING DRIVE SIGNALS FOR DRIVING AN SMA APPARATUS

CROSS-REFERENCE TO RELATED APPLICATIONS

This application is a national stage application under 35 U.S.C. § 371 of International Application No. PCT/GB2022/051416, filed Jun. 6, 2022, which claims priority of GB Patent Application No. 2108092.4, filed Jun. 7, 2021, the disclosures of each of which are hereby incorporated by reference herein in their entireties.

FIELD

The present invention generally relates to a method of generating drive signals for driving a shape memory alloy (SMA) apparatus, in particular to an SMA apparatus comprising multiple SMA actuator assemblies. The present invention further relates to a computer program product, a non-transitory data carrier and an apparatus for carrying out the method.

BACKGROUND

There are a variety of types of actuator assembly in which it is desired to provide positional control of a movable part relative to a support structure. Such actuator assemblies may be used in cameras, in which a lens element and an image sensor are moved relative to each other. For example, WO 2013/175197 A1 discloses a SMA actuator assembly in which a total of four SMA wires are used to move a lens element relative to an image sensor in a plane orthogonal to the optical axis of the lens element, thereby providing optical image stabilization (OIS). An alternative SMA actuator assembly in which SMA wires are used to provide OIS by moving a movable image sensor relative to a lens element is disclosed in WO 2017/072535 A1. WO2007/113478 A1 and WO 2019/243849 A1 disclose an actuator assembly in which SMA wire is used to move a lens element relative to an image sensor in a direction along the optical axis of the lens element, thereby providing auto-focus or zoom functionality. Such actuator assemblies may measure an electrical characteristic, such as the resistance, of the SMA wires for feedback control of the SMA wires.

An apparatus may comprise multiple such SMA actuator assemblies. For example, a camera apparatus may comprise an SMA actuator assembly for effecting OIS and another SMA actuator assembly for effecting auto-focus and zoom functionality.

The inventors have found that driving multiple SMA actuator assemblies in an apparatus can interfere with the sensitive measurement of the electrical characteristic of an SMA wire in one of the SMA actuator assemblies, for example due to cross talk (such as electro-magnetic interference EMI or direct interference between driver chips sharing a power supply) between the SMA actuator assemblies. This may degrade the measurement of the electrical characteristic, negatively affecting control of the SMA actuator assemblies. The problem can be more pronounced in battery-operated devices such as mobile phones, which tend to operate with a restricted power budget. This results in widespread use of pulse width modulation (PWM) techniques that can improve efficiencies, but which can lead to increased EMI.

SUMMARY

According to the present invention, there is provided a method of generating drive signals for driving an SMA apparatus, wherein the SMA apparatus comprises two SMA actuator assemblies each comprising a respective set of one or more SMA wires, the method comprising the steps of: outputting drive signals for applying to the SMA wires of the sets of SMA wires so as to independently drive the SMA actuator assemblies; and outputting a measurement pulse for measuring an electrical characteristic of an SMA wire, and suppressing or delaying the drive signals for applying to both sets of SMA wires for the duration of the measurement pulse, such that the measurement pulse is applied in the absence of any drive signal. The two SMA actuator assemblies may be driven independently. The two SMA actuator assemblies may be connected in mechanical series. For example, one SMA actuator assembly may be connected between a support structure and an intermediate movable part, and another SMA actuator assembly may be connected between the intermediate movable part and a movable part. Movement of the movable part relative to the support structure may thus be the addition of movement due to the two SMA actuator assemblies. The SMA actuator assemblies may drive movement in different degrees of freedom, for example one in a plane and one along an axis perpendicular to the plain. The two SMA actuator assemblies may also be connected separately to the support structure, such that one SMA actuator assembly drives movement of a first movable part and another SMA actuator assembly drives movement of a second movable part. In such embodiments, the SMA actuator assemblies may be considered to be connected in mechanical series between the first and second movable parts.

According to the present invention, there is also provided a computer program product comprising instructions which, when the program is executed by a processor, cause the processor to carry out the method.

According to the present invention, there is also provided a non-transitory data carrier comprising instructions which, when executed by a processor, cause the processor to carry out the method.

According to the present invention, there is also provided an apparatus comprising: a support structure; a first SMA actuator assembly comprising a first movable part and a first set of one or more SMA wires arranged to drive movement of the first movable part relative to the support structure; a second SMA actuator assembly comprising a second movable part and a second set of one or more SMA wires arranged to drive movement of the second movable part relative to the support structure and/or the first movable part; and one or more driver chips configured to perform the method.

Further aspects of the present invention are set out in the dependent claims.

BRIEF DESCRIPTION OF THE DRAWINGS

Certain embodiments of the present invention will now be described, by way of example only, with reference to the accompanying drawings in which.

DETAILED DESCRIPTION

Broadly speaking, the present invention provides a method of driving an SMA apparatus comprising multiple SMA actuator assemblies.

Apparatus Comprising Multiple SMA Actuator Assemblies

Figure 1A:
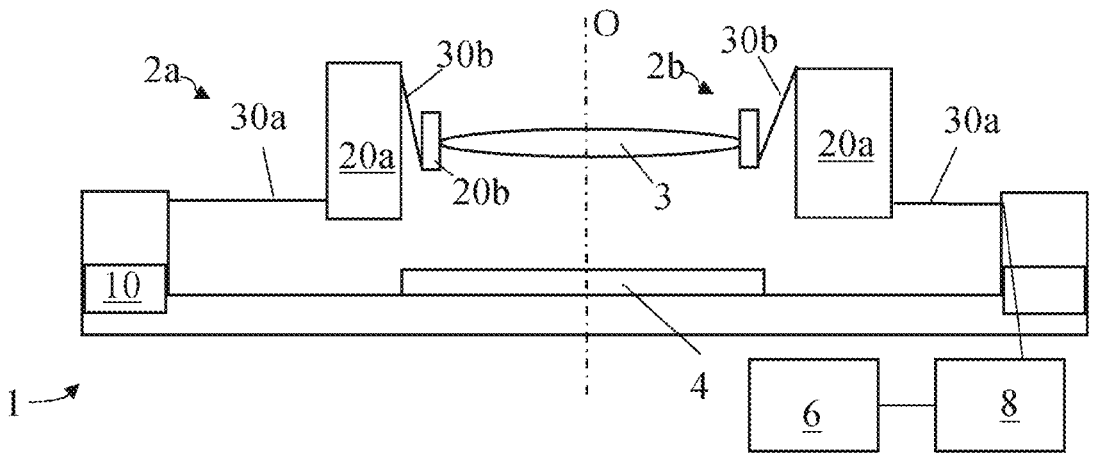
FIGS. 1a and 1b show embodiments of an apparatus comprising a multiple SMA actuator assembly.

FIG. 1a schematically shows an example of an apparatus 1 comprising two SMA actuator assemblies 2a and 2b. The apparatus 1 is a camera apparatus 1. The apparatus 1 is to be incorporated in a portable electronic device such as a mobile telephone, or tablet computer. Thus, miniaturisation is an important design criterion.

The apparatus comprises a support structure 10 and two SMA actuator assemblies 2a, 2b. Each SMA actuator assembly 2a, 2b comprises a respective movable part 20a, 20b. The first movable part 20a of the first SMA actuator assembly 2a is supported on the support structure 10. The first movable part 20a is movable relative to the support structure 10. For example, the first movable part 20a may be supported in a manner allowing movement of the movable part 20 relative to the support structure 10 in a plane orthogonal to an axis O. Movement along the axis O may be constrained or prevented.

The second movable part 20b of the second SMA actuator assembly 2b is supported on the first movable part 20a. The second movable part 20b is supported in a manner allowing movement of the second movable part 20b relative to the first movable part 10a and relative to the support structure 10 along the axis O. Movement orthogonal to the axis O may be constrained or prevented. The axis O coincides with the optical axis O of optical components (such as a lens 3) of the apparatus 1.

Each of the SMA actuator assemblies 2a, 2b comprises a respective set of one or more SMA wires 30. A "set of one or more SMA wires 30" is herein also referred to as a "set of SMA wires 30", and it will be understood that a set of SMA wires 30 may comprise one or more SMA wires 30. Each set of SMA wires 30a, 30b can move a different movable part 20a, 20b. The SMA wires 30 are connected in tension between the support structure 10 and the first movable part 20a, or between the second movable part 20b and the first movable part 20a. The SMA wires 30 are connected at their ends to the support structure 10 and/or to the movable part 20 using connection elements, for example crimp connections. The crimp connections may crimp the SMA wires 30 to hold the SMA wires 30 mechanically, as well as providing electrical connections to the SMA wires 30. However, any other suitable connections may alternatively be used. The SMA wires 30 are capable, on selective contraction, of driving movement of the movable parts 20a, 20b.

The first movable part 20a may be supported (so suspended) on the support structure 10 exclusively by the SMA wires 30. The second movable part 20b may be supported (so suspended) on the first movable part 20a exclusively by the SMA wires 30. However, preferably, each SMA actuator assembly 2a, 2b comprises a respective bearing arrangement (not shown) that supports the movable part. The bearing arrangement may have any suitable form for allowing movement of the respective movable part 20a, 20b. For this purpose, the bearing arrangement may, for example, comprise a rolling bearing, a flexure bearing or a plain bearing.

The camera apparatus 1 further comprises a lens assembly 3 and an image sensor 4. The lens assembly 3 comprises one or more lenses configured to focus an image on the image sensor 4. The image sensor 4 captures an image and may be of any suitable type, for example a charge coupled device (CCD) or a CMOS device. The lens assembly 3 comprises a lens carrier, for example in the form of a cylindrical body, supporting the one or more lenses. The apparatus 1 may be a miniature camera apparatus in which the or each lens of the lens assembly 3 has a diameter of 20 mm or less, preferably of 12 mm or less. The one or more lenses may be fixed in the lens carrier, or may be supported in the lens carrier in a manner in which at least one lens is movable along the optical axis O, for example to provide zoom or focus, such as auto-focus (AF).

In the embodiment shown in FIG. 1, one or more lenses 3 of the lens assembly 3 are fixed relative to the second movable part 20b. The image sensor 4 is fixed relative to the support structure 10, i.e. mounted on the support structure 10. In other embodiments (not shown), the lens 3/lens assembly 3 may be fixed relative to the support structure 10 and the second movable part 20b may comprise the image sensor 4. In yet further embodiments, the lens/lens assembly 3 may be fixed relative to one of the movable parts 20a, 20b, and the image sensor 4 may be fixed relative to the other movable part 20a, 20b. This may be the case, for example, when both sets of SMA wires 30a, 30b move the respective movable parts 20a, 20b relative to the support structure 10.

In either case, in operation the lens 3 or lens assembly 3 may be moved relative to the image sensor 4. For example, in the depicted embodiment, the first set of SMA wires 30a moves the first movable part 20a (and so the lens/lens assembly 3) in the plane orthogonal to the axis O. This has the effect that the image on the image sensor 4 is moved, so as to effect optical image stabilization (OIS). The second set of SMA wires 30b moves the second movable part 20b along the axis O. This has the effect that the focus of the image on the image sensor 4 is adjusted, so as to effect autofocus (AF) or other focus or zoom functionality may be implemented in the apparatus 1.

The camera apparatus 1 further comprises a controller 8. The controller 8 may be implemented in one or more driver chips, i.e. integrated circuit (IC) chips or driver ICs. The camera apparatus 1 may comprise one driver chip to control both SMA actuator assemblies 2a, 2b, or the camera apparatus 1 may comprise multiple, e.g. two, driver chips to control both SMA actuator assemblies 2a, 2b. The controller 8 generates drive signals for the first and second sets of SMA wires 30a, 30b.

SMA material has the property that on heating it undergoes a solid-state phase change that causes the SMA material to contract. Thus, applying drive signals to the SMA wires 30a, 30b, thereby heating the SMA wires 30a, 30b by allowing an electric current to flow, will cause the SMA wires 301, 30b to contract and move the movable parts 20a, 20b. The drive signals are chosen to drive movement of the movable parts 20a, 20b in a desired manner, for example so as to achieve OIS by stabilizing the image sensed by the image sensor 4 and/or to achieve AF by focussing the image on the image sensor 4. The controller 8 supplies the generated drive signals to the SMA wires 30.

Optionally, the camera apparatus comprises a vibration sensor 6. The vibration sensor 6 may be a gyroscope sensor, for example, although in general other types of vibration sensor 6 could be used. The vibration sensor 6 detects vibrations that the camera apparatus 1 is experiencing and generates output signals representative of the vibration of the camera apparatus 1. The controller 8 receives the output signals, and generates the drive signals for the SMA wires 30 in response to the output signals, for example so as to counteract the vibrations represented by the output signals. The controller 8 may thus control the SMA wires 30 to achieve OIS.

Figure 1B:
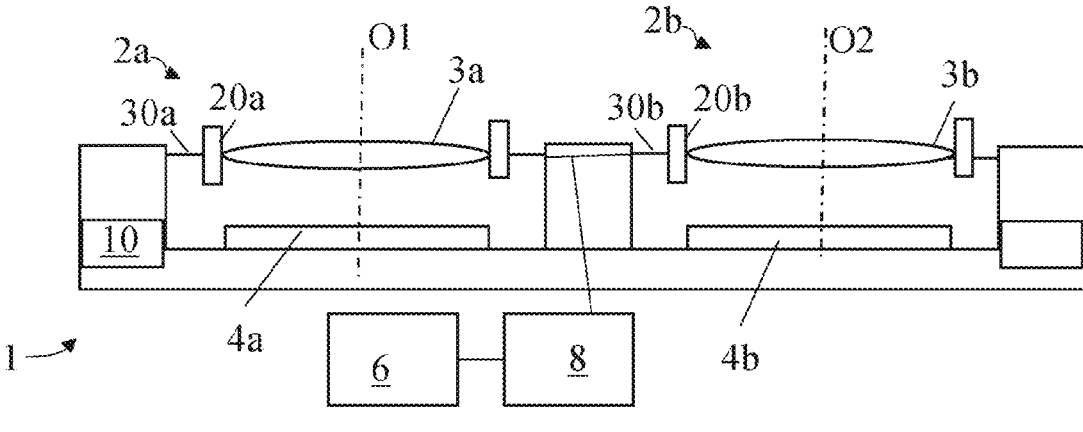

FIG. 1*b* schematically shows an example of another apparatus 1 comprising two SMA actuator assemblies 2*a* and 2*b*. The apparatus 1 is a dual camera apparatus 1. The apparatus 1 is to be incorporated in a portable electronic device such as a mobile telephone, or tablet computer. Thus, miniaturisation is an important design criterion.

The apparatus 1 comprises a support structure 10 and two SMA actuator assemblies 2*a*, 2*b*. Compared to the embodiment of FIG. 1*a*, the movable parts 20*a*, 20*b* of the two SMA actuator assemblies 2*a*, 2*b* are both supported on the support structure 10, for example in the manner described for the first movable part 20*a* in relation to FIG. 1*a*. The movable parts 20*a*, 20*b* are thus supported in a manner allowing movement in a plane orthogonal to an axis O. Each SMA actuator assembly 2*a*, 2*b* comprises a set of SMA wires 30*a*, 30*b* to move the respective movable part 20*a*, 20*b*, thereby effecting OIS.

The apparatus 1 comprises two lens assemblies 3*a*, 3*b* with lenses 3*a*, 3*b* and two image sensors 4*a*, 4*b*. The two image sensors 4*a*, 4*b* are fixed relative to the support structure 10, and each lens 3*a*, 3*b* or lens assembly 3*a*, 3*b* is fixed relative to a respective movable part 20*a*, 20*b*. In alternative embodiments, the two lenses 3*a*, 3*b* or lens assemblies 3*a*, 3*b* may be fixed relative to the support structure 10, and each image sensor 4*a*, 4*b* is fixed relative to a respective movable part 20*a*, 20*b*. In either case, the apparatus 1 effectively comprises two cameras, each being provided with OIS. Of course, in alternative embodiments, each camera may be provided with AF or other zoom functionality, or each camera may be provided with both OIS and AF or other zoom functionality.

The camera apparatuses 1 described above may comprise an SMA actuator assembly for the purpose of effecting OIS. So, the first and/or second SMA actuator assembly 2*a*, 2*b* may comprise or correspond to the SMA actuator assemblies as described in WO2013/175197 A1, WO 2011/104518 A1, and WO2017/072525, each of which is herein incorporated by reference. Additionally or alternatively, the apparatus 1 may comprise an SMA actuator assembly for the purpose of effecting AF. So, the first and/or second SMA actuator assembly 2*a*, 2*b* may comprise or correspond to SMA actuator assemblies as described in WO2007/113478 A1 and WO 2019/243849, each of which is herein incorporated by reference.

So, in some embodiments, the SMA apparatus 1 is a camera apparatus 1 comprising an image sensor 4 and a lens assembly 3 for forming an image on the image sensor 4 arranged on the movable parts or support structure of the SMA apparatus. Drive signals may be output by the controller 8 for applying to the SMA wires 30 of one set of SMA wires 30*a* so as to effect optical image stabilization in the camera apparatus 1. Drive signals may be output by the controller 8 for applying to the SMA wires 30 of the other set of SMA wires 30*b* so as to effect focus or zoom in the camera apparatus 1.

In alternative embodiments, both of the first and second sets of SMA wires 30*a*, 30*b* may be provided to effect OIS. For example, one set of SMA wires 30*a* may be used to shift the image sensor 4 in the plane relative to the axis O, and another set of SMA wires 30*b* may be used to shift the lens 3 in the plane relative to the axis O. The image sensor 4 and lens 3 may be shifted in antiphase so as to provide a greater overall OIS effect than achievable by shifting only one of the image sensor 4 and lens 3. Similarly, one set of SMA wires 30*a* may be used to tilt the lens to effect OIS and the other set of SMA wires 30*b* may be used to shift the lens or image sensor to effect OIS.

In alternative embodiments, one of the sets of SMA wires 30*a*, 30*b* may be provided to effect super-resolution in the camera apparatus. For example, one set of SMA wires 30*a*, 30*b* may move the image sensor 4 or lens 3 in a manner such that the image formed by the lens 3 on the image sensor 4 is shifted by a sub-pixel distance. Two images may be taken a sub-pixel distance apart, and image processing may combine the images to provide a higher-resolution image.

In some embodiments, the SMA apparatus 1 is a dual camera apparatus 1 comprising two image sensor 4*a*, 4*b* and two lens assemblies 3*a*, 3*b* for forming respective images on the image sensors 4*a*, 4*b*, the image sensors 4*a*, 4*b* and lens assemblies 3*a*, 3*b* being arranged on the movable parts or support structure of the SMA apparatus 1. Drive signals may be output by the controller 8 for applying to the SMA wires 30 of one set of SMA wires 30*a* so as to effect optical image stabilization, focus or zoom of the image formed on one image sensor 4*a*. Drive signals may be output by the controller 8 for applying to the SMA wires 30 of the other set of SMA wires 30*b* so as to effect optical image stabilization, focus or zoom of the image formed on the other image sensor 4*b*.

Generally, however, the apparatus 1 according to the present invention need not be a camera apparatus. The apparatus 1 may be any apparatus comprising two or more SMA actuator assemblies, i.e. any apparatus 1 comprising two or more movable parts 20*a*, 20*b* and two or more sets of SMA wires 30*a*, 30*b*, each capable of independently moving a respective movable part 20*a*, 20*b*. Such apparatuses may, for example, include apparatuses for 3D sensing or for haptics applications, or for moving any desired movable parts (e.g. in SMA motors or other applications).

Control of the SMA wires

Figure 2A:
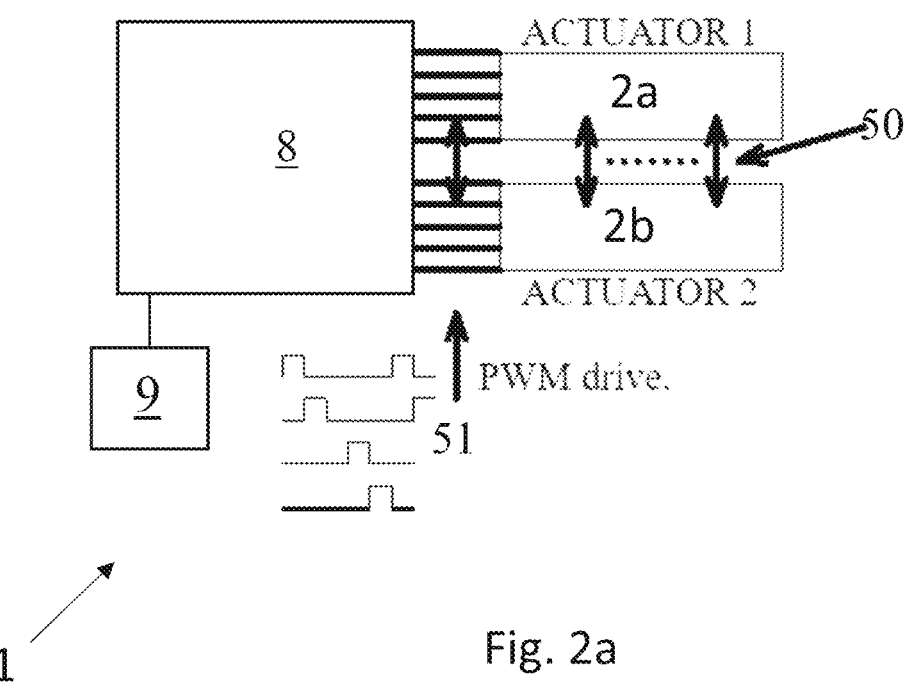
FIGS. 2a and 2b are schematic block diagrams of the control of an apparatus comprising multiple SMA actuator assemblies.
Figure 2B:
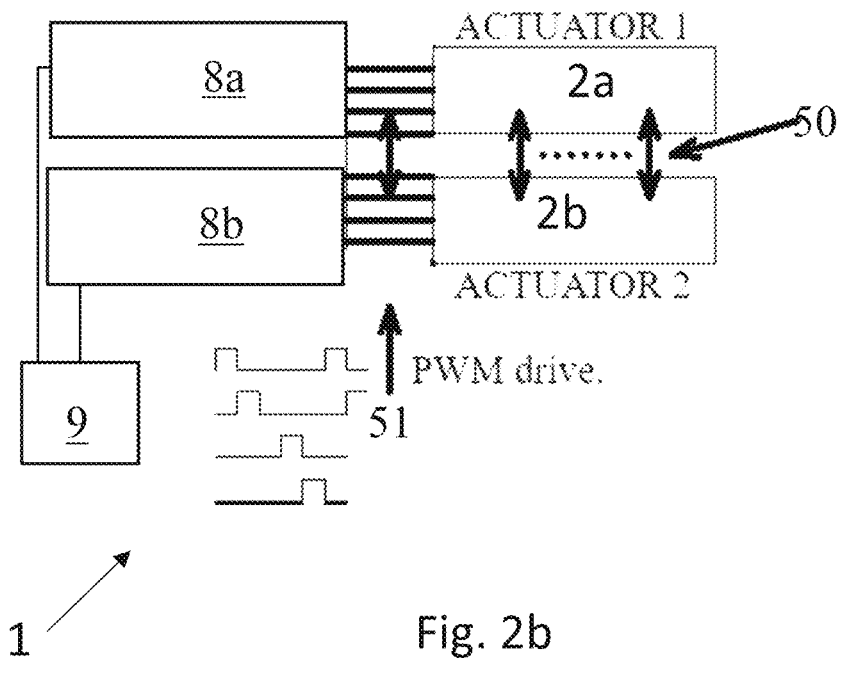

FIGS. 2*a* and 2*b* show schematic block diagrams of the control of the apparatus 1. The apparatus 1 of FIG. 2*a* comprises a single driver chip 8 that controls two SMA actuator assemblies 2*a*, 2*b*. The driver chip 8 is powered by a power supply 9. The apparatus 1 of FIG. 2*b* comprises two driver chips 8*a*, 8*b* that control two SMA actuator assemblies 2*a*, 2*b*. The two driver chips share a power supply 9, i.e. the driver chips 8*a*, 8*b* are both powered by the power supply. In general, the apparatus 1 may comprise any number of driver chips and any number of SMA actuator assemblies. The one or more driver chips 8*a*, 8*b* in combination are herein also referred to as a controller 8.

For illustrative purposes, control of the apparatus 1 is described based on two SMA actuator assemblies 2*a*, 2*b*, each comprising a respective set of four SMA wires 30*a*, 30*b*. However, in general, each SMA actuator assembly 2*a*, 2*b* may comprise a set of any number of SMA wires 30*a*, 30*b*. The SMA actuator assemblies 2*a*, 2*b* may comprise sets with different numbers of SMA wires 30*a*, 30*b*. For example, an SMA actuator assembly 2*a* for effecting OIS may comprise four SMA wires 30*a* and an SMA actuator assembly 2*b* for effecting AF may comprise one or two SMA wires 30*b*.

As depicted in FIGS. 2*a* and 2*b*, there may be cross talk 50 between the SMA actuator assemblies 2*a*, 2*b*. The present invention is concerned with dealing with such cross-talk 50.

Figure 3A:
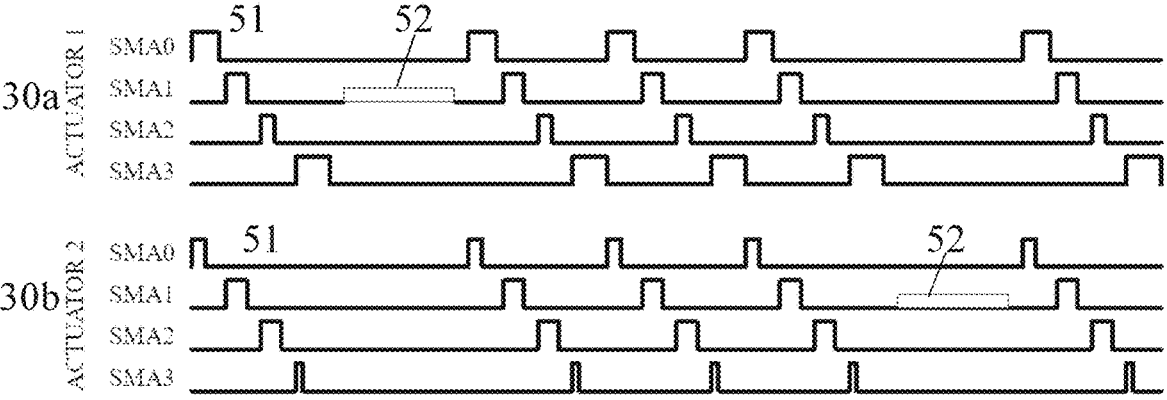
FIGS. 3a and 3b schematically show drive signals and measurement pulses applied to the apparatus.
Figure 3B:
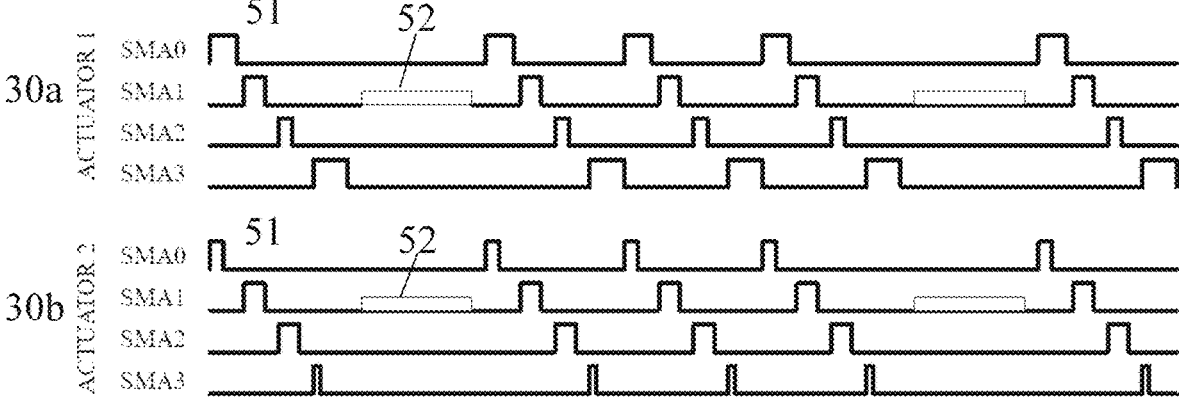

Signals applied to the SMA wires FIGS. 3*a* and 3*b* schematically depict drive signals 51 and measurement pulses 52 that are output by the controller 8. The top four traces of FIGS. 3*a* and 3*b* correspond to drive signals 51 that are applied to the first SMA actuator assembly 2a. The bottom four traces of FIGS. 3a and 3b correspond to drive signals 51 that are applied to the second SMA actuator assembly 2b.

Drive Signals 51

The drive signals 51 may comprise voltage pulses. The drive signals 51 may be a succession of pulses output at a PWM frequency. The drive signals may be pulse width modulated (PWM) signals for driving the SMA wires 30. In the illustrated embodiment, the controller 8 generates four PWM signals SMA1-4. The controller generates a separate PWM signal for each SMA wire 30 in each SMA actuator assembly 30a, 30b. Each PWM signal SMA1-4 controls a different one of the SMA wires 30. In general, the PWM driver 81 may generate any number of PWM signals, to control any number of SMA wires 30.

The drive signals are applied to the sets of SMA wires 30a, 30b so as to independently drive the SMA actuator assemblies 2a, 2b. So, the drive signals 51 applied to the first set of SMA wires 30a (i.e. the drive signals 51 for driving the first SMA actuator assembly 2a) are independent to those applied to the second set of SMA wires 30b (i.e. those for driving the second SMA actuator assembly 2b). The drive signals 51 for the first set of SMA wires 30a may be different to the drive signals 51 for the second set of SMA wires 30b. This is desirable even in the embodiment of FIG. 1b, because unavoidable manufacturing differences between the SMA actuator assemblies 2a, 2b make it desirable to drive these SMA actuator assemblies 2a, 2b independently from one another so as to achieve accurate and reliable movement of the respective movable parts 20a, 20b.

The drive signals SMA1-4 each comprise a pulse train. The frequency of the pulse train is the PWM frequency. The period between starts of adjacent pulses in the PWM control signals SMA1-4 is the PWM period. The pulses of the PWM signals SMA1-4 are preferably square pulses as shown in FIGS. 3a and 3b, although in general pulses with other shapes may also be used. Switching the PWM control signals SMA1-4 thus gives rise to rising or falling edges in the PWM signals. As shown in FIGS. 3a and 3b, the amplitude of the pulses of the PWM signal SMA1-4 is preferably constant, such that the power applied to the SMA wires 30 is controlled solely or at least primarily by adjusting the width of the pulses of the PWM signals SMA1-4. In some embodiments, the amplitude of the PWM signals SMA1-4 may also be adjusted so as to provide additional control of the power provided to the SMA wires 30.

Preferably, none of the PWM signals SMA1-4 overlap, so the pulses of the PWM signals SMA1-4 are scheduled to be generated sequentially and not concurrently. The PWM signals SMA1-4 may thus be interleaved, as shown in FIGS. 3a and 3b. However, in general, some or all of the PWM control signals SMA1-4 may overlap, at least in certain situations (such as low temperature operation of the actuator assemblies 2a, 2b).

As shown in FIGS. 3a and 3b, preferably the drive signals for applying to the SMA wires 30 within a set of SMA wires 30a, 30b are output sequentially. In such a case, the maximum power deliverable by the controller 8 may be applied to a select SMA wire 30 at any one time. However, in general, there may be some overlap between drive signals 51 applied to SMA wires 30 within a set of SMA wires 30a, 30b.

FIGS. 3a and 3b depict in situation in which the drive signals 51 for applying to the SMA wires 30 of different sets of SMA wires 30a, 30b are output concurrently. The drive signals 51 for driving the first SMA actuator 2a are output concurrently with the drive signals 51 for driving the second SMA actuator 2b. This may be preferable, in particular, in situations in which the apparatus 1 comprises a dedicated driver chip for each set of SMA wires 30a, 30, e.g. as in FIG. 2b. However, in general, the drive signals for applying to the SMA wires of different sets of SMA wires 30a, 30b may be output sequentially. So, the drive signals 51 for driving the first SMA actuator 2a may be output before the drive signals 51 for driving the second SMA actuator 2b. There may also be some overlap between the drive signals 51 for driving the first SMA actuator 2a and the drive signals 51 for driving the second SMA actuator 2b.

The drive signals 51 may be output at the PWM frequency. The PWM frequency may be selected so as to reduce image noise in an image sensor 4a, 4b associated with the SMA actuator assembly 2a, 2b. In particular, the PWM period may be set as equal to or an integer multiple of the correlated double sampling (CDS) period of the image sensor 4a, 4b. The inventors have found that this reduces image noise in the image sensor. This is described in co-pending application GB2019726.5, which is herein incorporated by reference.

Preferably, the PWM frequency of the drive signals applied to the SMA wires 30 within any set of SMA wires 30a, 30b is the same. So, each SMA wire 30 within a set of SMA wires 30a, 30b is driven at the same PWM frequency. This is preferable in situations in which the set of SMA wires 30a, 30b is approximate to an image sensor, so as to reduce image noise from driving any one of the SMA wires 30.

Driving each SMA wire 30 in a set of SMA wires 30 with the same PWM frequency may also reduce the complexity of control compared to situations in which this is not the case.

In some embodiments, the PWM frequency of the drive signals 51 for applying to the SMA wires of one set of SMA wires 30a is different to the PWM frequency of the drive signals 51 for applying to the SMA wires of the other set of SMA wires 30b. For example, in the embodiment of FIG. 1b, the sets of SMA wires 30a, 30b are proximate different image sensors 4a, 4b. Image noise may be optimally reduced in each image sensor 4a, 4b at different PWM frequencies. For example, the image sensors may have different CDS periods associated therewith, and each set of SMA wires 30a, 30b may be driven with a PWM frequency that corresponds to the CDS period of the corresponding image sensor 4a, 4b.

In some embodiments, the PWM frequency of the drive signals 51 for applying to the SMA wires 30 of different sets of SMA wires 30a, 30b is the same. For example, in the embodiment of FIG. 1a, the sets of SMA wires 30a, 30b are proximate the same image sensor 4. The same PWM frequency is thus used to drive both sets of SMA wires 30a, 30b so as to optimally reduce image noise.

Measurement Pulses Applied to SMA Wires

In addition to generating the PWM signals SMA1-4, the controller 8 may measure an electrical characteristic, such as the resistance, of the SMA wires 30. The length of the SMA wire 30 is a function of the resistance of the SMA wire 30. The measured electrical characteristic may thus provide a measure of the length of a respective SMA wire 30, and so ultimately allows determination of the position of the movable part 20. The determined position of the movable part 20 may be compared to a desired position of the movable part 20, and the PWM signal SMA1-4 may be adjusted to bring the movable part 20 closer to the desired position. So, the controller 8 may comprise closed loop control to generate the PWM control signals SMA1-4. The measured electrical characteristic, or a measure (such as the length of the SMA wires 30) derived from the measured electrical characteristic may be fed back to the closed loop control.

The controller 8 may determine the electrical characteristic of an SMA wire 30 by outputting a measurement pulse for applying to the SMA wire 30. As shown in FIGS. 3*a* and 3*b*, the drive signals 51 for applying to both sets of SMA wires 30*a* 30*b* are suppressed or delayed for the duration of the measurement pulse 52. So, the measurement pulse 52 is applied in the absence of any drive signal 51.

In prior art devices, there may be no synchronization between the SMA actuator assemblies 2*a*, 2*b* for the purpose of scheduling the measurement pulses. As a result, one of the SMA actuator assemblies 2*a* may be driven by drive signals 51 while the other SMA actuator assembly 2*b* is subject to a measurement of the electrical characteristic. The inventors have found that this may lead to noise in the measurement of the electrical characteristic, for example due to capacitively or inductively induced EMI, or due to direct interference between the SMA wires 30 (e.g. due to being driven by the same power source).

Suppressing or delaying the drive signals 51 for applying to both sets of SMA wires 30*a* 30*b* for the duration of the measurement pulse 52 reduces or avoids this problem and makes the measurement of the electrical characteristic more reliable.

The measurement pulses 52 may be output sequentially for measuring an electrical characteristic of each SMA wire 30 within a set of SMA wires 30*a*, 30*b*. So, a measurement pulse 52 may be applied to SMA wire SMA1, followed by a measurement pulse 52 for SMA wire SMA2, and so on. Similarly, measurement pulses for SMA wires 30 of different sets of SMA wires 30*a*, 30*b* may be output sequentially. So, for example, measurement pulses 52 may be applied to all SMA wires 30 in the first set of SMA wires 30*a* in sequence, followed by measurement pulses 52 applied to all SMA wires 30 in the second set of SMA wires 30*b*. The measurement pulses 52 applied to different sets of SMA wires 30*a*, 30*b* may also be interleaved, for example by applying a measurement pulse to the first SMA wire SMA1 of the first set of SMA wires 30*a*, followed by a measurement pulse to the first SMA wire SMA 1 of the second set of SMA wires 30*b*, followed by a measurement pulse to the second SMA wire SMA2 of the first set of SMA wires 30*a*, and so on. In general, the measurement pulses may be applied to the SMA wires 30 of different sets of SMA wires 30*a*, 30*b* in any appropriate order.

In some embodiments, a measurement pulse 52 for an SMA wire 30 of one set SMA wires 30*a* is output concurrently with a measurement pulse 52 for an SMA wire 30 of the other set of SMA wires 30*b*. This is shown for example in FIG. 3*b*, in which a measurement pulse 52 is applied to SMA wire SMA1 of the first set of SMA wires 30*a* at the same time as a measurement pulse 52 applied to SMA wire SMA1 of the second set of SMA wires 30*b*. Applying measurement pulses 52 at the same time for different sets of SMA wires 30*a*, 30*b* may reduce the time necessary for suppressing or delaying the drive signals 51, so that driving of the SMA wires 30*a*, 30*b* may be more efficient.

Preferably, the measurement pulses for all SMA wires 30 within a set of SMA wires 30*a*, 30*b* are the same. Further preferably, the measurement pulses for all SMA wires 30 are the same. This makes derivation of the electrical characteristic from the measurement less complex.

Preferably, the energy output of the measurement pulse 52 for an SMA wire 30 is less than that of the drive signal 51 for applying to the SMA wire 30. It is desirable to reduce or minimize the impact of the measurement pulse 52 on heating (and so driving) of the SMA wire 30. Furthermore, the reduced energy output will mitigate the risk of cross-talk between SMA actuator assemblies 2*a*, 2*b* during application of the measurement pulses 52.

Preferably, the duration of the measurement pulse 52 is longer than that of pulses of the drive signals 51. There may be a minimum duration required for determining an accurate measure of the electrical characteristic of the SMA wire 30, and so the duration of the measurement pulse may be appropriately long compared to the duration of pulses of the drive signal 51.

Preferably, the measurement pulse 52 is a current pulse, in particular a current pulse of predetermined and known amplitude. This allows the electrical characteristic to be determined by taking a measure of the voltage across the SMA wire 30 as the known current flows through the SMA wire 30. The measurement pulse 52 may be generated by a current source. The measurement pulse 52 may thus be generated by a source different to the source for generating the drive signals 51. The source for generating the drive signals 51 may be a voltage source. Providing different sources for the measurement pulses 52 and the drive signals 51 may reduce or avoid the impact of the drive signals 51 on the uniformity or reliability of the measurement pulses 52.

However, in general the measurement pulse 52 may be any other pulse suitable for measuring an electrical characteristic of the SMA wire 30. For example, the measurement pulse may be a voltage pulse. In such embodiments, a sense resistor (not shown) may be connected in series with the SMA wires 30, and the voltage across the sense resistor (as a proportion of the voltage applied to the SMA wire—sense resistor—series) may provide a measure of the electrical characteristic of the SMA wire 30.

The measurement pulses 52 may be applied to the SMA wires 30 periodically to gain continuous feedback as to the length of the SMA wires 30 during operation of the apparatus 1.

For example, a measurement pulse 52 for each SMA wire 30 may be output once every n PWM periods, where n is an integer.

The output of the drive signals 51 may be withheld during output of a measurement pulse 52 and resume after output of the measurement pulse 52. On resumption, the drive signals 51 may be reset so as to restart by applying a drive signal 51 to the first SMA wire, for example.

Alternatively, the drive signals 51 may not reset and be applied to the SMA wires 30 in accordance with the normal drive scheme. For example, a drive signal 51 may be applied to SMA wire SMA0, then a measurement pulse 52 may be output during the time in which drive signals are usually applied to SMA wires SMA1, SMA2 (and these drive signals are withheld), and then a drive signal may be applied to SMA wire SMA3. So, the drive signals 51 may be output during respective active periods. The measurement pulse 52 may be output during an active period instead of a respective drive signal.

The measurement pulses 52 may be interleaved between pulses of the drive signals 51 in any appropriate manner. Different methods of interleaving measurement pulses 52 between pulses of the drive signals are disclosed in WO 2020/115260 A1, which is herein incorporated by reference. Any of the methods described in WO 2020/115260 A1 (although only in reference to a single SMA actuator assembly) may be used in embodiments of the present invention. For example, a measurement pulse 52 to one SMA wire 30 may be output once every n PWM periods, where n is an integer (e.g. once every PWM period). Alternatively, measurement pulses 52 may be applied to all SMA wires in immediate sequence, and that may be repeated periodically, for example once every n PWM periods, where n is an integer (e.g. once every four PWM periods).

For example, for each set of SMA wires, a measurement pulse 52 may be output during a measurement period, and wherein a measurement period is defined whereby in an nth measurement period a drive signal 51 applied to the SMA wire n is suppressed and a measurement pulse is applied to SMA wire n instead, whereby n cycles through the values 1 to m, where m is equal to the number of SMA wires of the set of SMA wires.

In another example, for each set of SMA wires, for a first given time the drive signals applied to the SMA wires may be suppressed or withheld and measurement pulses may be applied sequentially to each SMA wire of the set of one or more SMA wires. The first given time may be a PWM period associated with the PWM frequency of the drive signals applied to the SMA wires of the set of SMA wires.

The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

Those skilled in the art will appreciate that while the foregoing has described what is considered to be the best mode and where appropriate other modes of performing the present disclosure, the present disclosure should not be limited to the specific configurations and methods disclosed in this description of the preferred embodiment. Those skilled in the art will recognize that the present invention has a broad range of applications, and that the embodiments may take a wide range of modifications without departing from any inventive concept as defined in the appended claims.

The invention claimed is:

1. A method of generating drive signals for driving an SMA apparatus, wherein the SMA apparatus comprises two SMA actuator assemblies each comprising a respective set of one or more SMA wires, the method comprising the steps of:

outputting drive signals for applying to the SMA wires of the sets of SMA wires so as to independently drive the SMA actuator assemblies; and outputting a measurement pulse for measuring an electrical characteristic of an SMA wire, and suppressing or delaying the drive signals for applying to both sets of SMA wires for the duration of the measurement pulse, such that the measurement pulse is applied in the absence of any drive signal.

2. The method of claim 1, wherein measurement pulses are output sequentially for measuring an electrical characteristic of each SMA wire within a set of SMA wires.

3. The method of claim 1, wherein a measurement pulse for an SMA wire of one set SMA wires is output concurrently with a measurement pulse for an SMA wire of the other set of SMA wires.

4. The method of claim 1, wherein the duration of the measurement pulse is longer than that of pulses of the drive signals.

5. The method of claim 1, wherein the measurement pulse is generated by a source that is different than a source for generating the drive signals.

6. The method of claim 1, wherein the drive signals for applying to the SMA wires within a set of SMA wires are output sequentially.

7. The method of claim 1, wherein the drive signals for applying to the SMA wires of different sets of SMA wires are output concurrently.

8. The method of claim 1, wherein the drive signals are a succession of pulses output at a PWM frequency.

9. The method of claim 8, wherein the PWM frequency of the drive signals for applying to the SMA wires of one set of SMA wires is different to the PWM frequency of the drive signals for applying to the SMA wires of the other set of SMA wires.

10. The method of claim 1, wherein a measurement pulse for each SMA wire is output once every n PWM periods, where n is an integer.

11. The method of claim 1, wherein the drive signals are output during respective active periods, and wherein the measurement pulse is output during an active period instead of a respective drive signal.

12. The method of claim 1, wherein for each set of SMA wires, a measurement pulse is output during a measurement period, and wherein a measurement period is defined whereby in an nth measurement period a drive signal applied to an SMA wire n is suppressed and a measurement pulse is applied to the SMA wire n instead, whereby n cycles through values 1 to m, where m is equal to the number of SMA wires of the set of SMA wires.

13. The method of claim 1, wherein the SMA apparatus is a camera apparatus comprising an image sensor and a lens assembly for forming an image on the image sensor arranged on movable parts or a support structure of the SMA apparatus, wherein the method comprises;

outputting drive signals for applying to the SMA wires of one set of SMA wires to effect optical image stabilization in the camera apparatus; and outputting drive signals for applying to the SMA wires of the other set of SMA wires to effect focus or zoom in the camera apparatus.

14. The method of claim 1, wherein each SMA actuator assembly comprises a respective movable part and each set of SMA wires is arranged, on contraction, to move the respective movable part.

15. A non-transitory data carrier comprising instructions which, when executed by a processor, cause the processor to carry out the method of claim 1.

16. An apparatus comprising:

a support structure;

a first SMA actuator assembly comprising a first movable part and a first set of one or more SMA wires arranged to drive movement of the first movable part relative to the support structure;

a second SMA actuator assembly comprising a second movable part and a second set of one or more SMA wires arranged to drive movement of the second movable part relative to the support structure and/or the first movable part; and one or more driver chips configured to perform the method of claim 1.

17. The apparatus of claim 16, wherein the one or more driver chips comprise one driver chip configured to drive both the first and second sets of SMA wires.

18. The apparatus of claim 16, wherein the one or more driver chips comprise a first driver chip configured to drive the first set of SMA wires and a second driver chip configured to drive the second set of SMA wires.

19. The apparatus of claim 16, wherein the first set of SMA wires is arranged to drive movement of the first movable part relative to the support structure in a plane perpendicular to a principal axis; and wherein the second set of SMA wires is arranged to drive movement of the second movable part relative to the support structure and/or the first movable along the principal axis.

20. The apparatus of claim 16, wherein:

the apparatus is a camera apparatus that comprises an image sensor and a lens assembly for forming an image on the image sensor;

the image sensor is fixed relative to the support structure or the first movable part; and the lens assembly is fixed relative to the second movable part.

\* \* \* \* \*